3,219,519
STARCH ETHERS IN PAPER
Edwin J. Barber, Ralph H. Earle, Jr., and George C. Harris, Wilmington, Del., assignors to Hercules Powder Company, Wilmington, Del., a corporation of Delaware
No Drawing. Filed Mar. 28, 1963, Ser. No. 268,566
11 Claims. (Cl. 162—175)

The present invention relates to improved paper and process of preparing same, and more particularly to making paper of increased dry strength and excellent formation either in the presence or absence of one or more other materials (hereinafter defined) used in papermaking and the resulting paper product.

In copending application Serial No. 268,565, entitled Reaction Product of Dialdehyde With Starch Ether in Paper, and filed on even date herewith, it was found that while the use as internal additive of cationic-nonionic starch ethers which were gelatinized during their preparation gave paper of substantially increased dry strength, this increase in dry strength was accomplished at the serious sacrifice of sheet formation. In accordance with said copending application it was found that increased dry strength was obtained without sacrifice of sheet formation by using the reaction products of dialdehydes and cationic-nonionic starch ethers, said starch ethers having been gelatinized during their preparation. In said copending application it was also found that the dialdehyde treated starch ethers thereof served as good retention aids for various materials used in papermaking, and that said starch ethers serve these two functions simultaneously or separately.

In accordance with the present invention we have found to our surprise that cationic-nonionic starch ethers identical to those in said copending application, except that gelatinization was avoided during their preparation, give the following:

(1) Even somewhat better dry strength properties as compared with either gelatinized cationic-nonionic starch ethers or the dialdehyde-gelatinized cationic-nonionic starch ether reaction products of said copending application (2) Far better formation than gelatinized cationic-nonionic starch ethers and at least as good formation as the dialdehyde-gelatinized cationic-nonionic starch ether reaction products of said copending application (3) Substantially better retention of paper additives (hereinafter defined) than either gelatinized dialkyl-aminoalkyl hydroxyalkyl starch ethers or the dialdehyde-gelatinized cationic-nonionic starch ether reaction products of said copending application.

We are not yet certain of the mechanism which might explain these substantial differences in behavior and at present could only offer theory which it is felt would be of little or no value and perhaps would unnecessarily complicate the understanding of the present invention. Suffice it to say that we have found the important thing is to avoid gelatinizing to any substantial degree *while preparing* the starch ethers hereof but to gelatinize same before use as herein described and claimed. Thus, gelatinization of the starch ethers used herein must be avoided during preparation thereof, but must be carried out prior to use thereof. From this it follows that something happens when gelatinizing said starch ethers during preparation which is quite different from what happens when gelatinizing the starch ethers after their preparation and prior to their use.

We intend that the starch ethers set forth in the appended claims be interpreted in the light of the immediately preceding three paragraphs.

As is well known in the papermaking art, papermaking comprises forming an aqueous slurry of a fibrous material, passing the slurry onto a screen and thereby forming a sheet of the fibrous material and causing most of the water to be removed therefrom by gravity, and then pressing and drying the sheet to obtain the final paper product. Various materials have been added to the fibers to increase the dry strength of the final paper product. These materials are mixed with the fibers at any point prior to forming the wet lap on the screen of the papermaking machine. They are referred to in the art as "internal additives" as contrasted with materials which are applied to the surface of the paper after it is made in the form of a sheet.

In accordance with the present invention, it has been found that paper of substantially increased dry strength and excellent formation results from carrying out the process which comprises incorporating with the papermaking fibers, prior to forming the wet lap, a gelatinized cationic-nonionic starch ether which was maintained in a substantially ungelatinized (i.e. granular) state during its preparation. It has also been found in accordance with the present invention that said starch ethers are good retention aids for paper additives, and that said starch ethers serve the functions of substantially increasing the dry strength of paper and retaining paper additives either simultaneously or separately.

The term "paper additives" is used herein to include internal additives used in papermaking other than said cationic-nonionic starch ethers hereof, typical examples of which are fillers, colored pigments, dyes, sizes, fiber fines, wax emulsions, latex emulsions, etc.

It is well known that starch, which in its natural state is in the form of discrete granules, will undergo gelatinization in the presence of water and sufficient alkali. The phenomenon of gelatinization involves the swelling, rupture and disintegration of the starch granule, so that it will form a hydrated colloidal dispersion in water. Gelatinized starch is referred to in the art as cold water soluble or swellable. Actually, cold water swellable is more accurate since gelatinized starch does not dissolve in the true sence of the term. In contrast, ungelatinized starch granules will settle out of water suspension and may be filtered and dried, still retaining their original granule form.

The term "cationic" is used herein to mean that the starch compounds include a tertiary amino group. Typical examples of cationic-nonionic derivatives of starch applicable herein are cationic-hydroxyalkyl derivatives of starch having the formula:

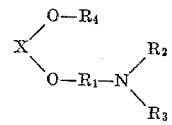

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycloalkyl, and $R_4$ is hydroxyalkyl. Of course, the $R_4$ group may be attached to the same anhydroglucos unit as the

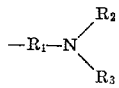

radical, or the $R_4$ group may be attached to a different anhydroglucose unit.

Thus, representative of the starch ethers applicable in the present invention are diethylaminoethyl hydroxypropyl starch, diethylaminoethyl hydroxyethyl starch, dimethylaminoethyl hydroxypropyl starch, diethylaminopropyl hydroxypropyl starch, morpholinoethyl hydroxypropyl starch, and the like.

The starches which may be used as a starting material in preparing the starch ethers may be derived from any sources including wheat, corn, tapioca, potato, waxy maize, sago, rice. The starch may be of any form also, including, e.g. raw starch, dextrinized starch, hydrolyzed starch, oxidized starch, and the like.

The purpose of the following paragraph is to explain the use herein and in the prior art of the terms "degree of substitution" ("D.S.") and "M.S."

There are three hydroxyl groups in each anhydroglucose unit in the starch molecule. D.S. is the average number of hydroxyl groups substituted in the starch per anhydroglucose unit. M.S. is the average number of moles of reactant combined with the starch per anhydroglucose unit. For the alkyl, carboxyalkyl, or acyl derivatives of starch, the D.S. and M.S. are the same. For the hydroxyalkyl derivatives of starch, the M.S. is generally greater than the D.S. The reason for this is that each time a hydroxyalkyl group is introduced into the starch molecule, an additional hydroxyl group is formed which itself is capable of hydroxyalkylation. As a result of this, side chains of considerable length may form on the starch molecule. The M.S./D.S. ratio represents the average length of these side chains. Thus, from the foregoing it will be seen that the D.S. of a starch derivative can be no higher than 3, whereas the M.S. may be considerably higher than 3, depending on the extent to which side chains are formed. Regarding the mixed ethers involved herein, the first value given is the aminoalkyl D.S. and the second value given is the hydroxyalkyl M.S.

As disclosed hereinbefore the starch ether products applicable in the present invention are cationic-nonionic starch ethers (e.g. dialkylaminoalkyl hydroxyalkyl starch ethers including diethylaminoethyl hydroxypropyl starch) which were maintained in a substantially ungelatinized (i.e. granular) state during their preparation but which were in a gelatinized state when used herein. These starch ether products and processes of preparing same are not per se a part of the present invention; both are well know in the art.

The following examples illustrate specific embodiments of the present invention but they are not intended to limit the invention beyond the scope of the claims appended hereto. In these examples and elsewhere herein per cent and parts are by weight unless otherwise indicated.

sheets (Example 2, Table 1) to compare with paper handsheets made with no DEAE-HPS (Example 1, Table 1). The other portion of the DEAE-HPS was used as internal additive in an alum free unsized system in making paper handsheets (Example 4, Table 2) to compare with paper handsheets made with no DEAE-HPS (Example 3, Table 2).

EXAMPLES 1 AND 2

*Paper handsheet preparation—alum and rosin sized system*

A 4.5% consistency unbleached kraft pulp slurry was beaten in pH 7 tap water in a Noble and Wood cycle beater to a Schopper-Riegler freeness of 820 cc. Aliquots of the pulp slurry were diluted to 2.5% consistency and chemicals were added thereto in the following order:

(1) DEAE-HPS (as said 1% aqueous solution above),
(2) 0.5% rosin size (by weight of dry pulp),
(3) 10% aqueous solution of papermakers' alum (i.e. hydrated aluminum sulfate) to reduce the pH to 4.5.

The treated pulp was diluted to 0.5% consistency in a Noble and Wood proportioner using tap water containing 5 p.p.m. aluminum (as papermakers' alum) and adjusted to pH 5 before pulp addition. Paper handsheets weighing 40 lb./ream (ream is 500 24" x 36" sheets) were formed in a Noble and Wood sheet mold. The pulp was diluted to 0.05% consistency in the mold with tap water adjusted to pH 5. The sheets were pressed and dried in the conventional manner of the Noble and Wood handsheet system. The sheets were conditioned and tested in accordance with TAPPI (Technical Association of the Pulp and Paper Industry) standard methods for the dry strength properties of Mullen burst, tensile, MIT folding endurance, and Elmendorf tear resistance. Formation was determined by thorough visual examination by an experienced papermaker. Resistance to penetration of 10% lactic acid ink was determined using the procedure described in TAPPI, vol. 36, January 1953, pages 42–46. The ink resistance values in Table 1 hereinafter are given in seconds required for sample reflectance to drop to the 85% level. In addition to giving good formation and substantially increased dry strength properties, the internal additive also serve well in retaining the rosin size on the pulp and thus giving paper of good ink resistance.

In the art of papermaking, it is common knowledge that the levels of certain paper properties, e.g. Elmendorf tear, are decreased during beating.

Further details appear in Table 1 hereinafter.

TABLE 1.—ALUM AND ROSIN SIZED SYSTEM

| Ex. No. | Internal Additive | | Mullen Burst, p.s.i. | | Tensile Strength, lb./in. | | MIT Fold Endurance, No. Double Folds | | Elmendorf Tear, G./Sheet | | Ink Resistance, Seconds | | Formation |
|---|---|---|---|---|---|---|---|---|---|---|---|---|---|
| | Type | Amount [2] | Actual | Increase [3] | Actual | Increase [3] | Actual | Increase [3] | Actual | Decrease [3] | Actual | Increase [3] | |
| 1 | Control | None | 34.1 | | 15.4 | | 136 | | 141 | | 242 | | Good. |
| 2 | DEAE-HPS [1] | 0.88 | 40.1 | 6.0 | 19.1 | 3.7 | 277 | 141 | 119 | 22 | 954 | 712 | Do. |

[1] Diethylaminoethyl hydroxypropyl starch maintained ungelatinized (i.e. granular) during preparation but which was in gelatinized state when used.
[2] Percent by weight of dry pulp.
[3] Based on untreated control (Example 1).

EXAMPLES 1–4

*Solution or dispersion preparation of internal additive*

1% aqueous solutions or dispersions of ungelatinized (i.e. granular) diethylaminoethyl hydroxypropyl starch (DEAE-HPS) were prepared by mixing in water at 25° C. They were heated to 95° C. in an oil bath and held at 95° C. for 15 minutes while agitating. The resulting gelatinized DEAE-HPS was divided into two portions. One portion was used as internal additive and size retention aid in making alum and rosin-sized paper hand-

EXAMPLES 3 AND 4

*Paper handsheet preparation—Alum free and unsized system*

These handsheets were prepared and tested in substantially the same manner as in Examples 1 and 2 hereinbefore except for the following differences. No size nor alum was used. Tap water of pH 7 was used in the proportioner and sheet mold. Pulp consistencies were 0.5% and 0.05% in the proportioner and sheet mold, respectively. Handsheets weighing about 85 lb./ream (ream is 500 24" x 36" sheets) were formed and dried in the conventional manner. The sheets were conditioned and tested according to TAPPI standard methods except for the crush test. The crush test was conducted according to the Concora test method commonly used by corrugating medium manufacturers. A ½-in. x 6-in. strip cut from the handsheets was fluted in a standard Concora fluter and mounted on a piece of masking tape. The specimen was then loaded in a standard Baldwin Universal tester, using a loading rate of 1 inch per minute, until the flutes collapsed. (A discussion of the Concora test method and its development appears in TAPPI, vol. 39, page 88–A, September 1956.)

Further details are given in Table 2 hereinafter.

TABLE 2.—ALUM FREE AND UNSIZED SYSTEM

| Example No. | Internal Additive | | Mullen Burst, p.s.i. | | Tensile Strength, lb./in. | | Concora Crush Resistance [4] | | Formation |
|---|---|---|---|---|---|---|---|---|---|
| | Type | Amount [2] | Actual | Increase [3] | Actual | Increase [3] | Actual | Increase [3] | |
| 3 | Control | None | 95 | | 50.1 | | 38.9 | | Good. |
| 4 | DEAE-HPS [1] | 0.88 | 112 | 17 | 57.6 | 7.5 | 43.6 | 4.7 | Do. |

[1] Diethylaminoethyl hydroxypropyl starch maintained ungelatinized (i.e. granular) during preparation but which was in gelatinized state when used.
[2] Percent by weight of dry pulp.
[3] Based on untreated control (Example 3).
[4] Total load in pounds.

The chief objective in presenting the following Examples 5–12 is to show that the starch ethers of the present invention are also very good retention aids. The amount of paper filler used in the examples herein was 10% by weight of the pulp on a dry basis.

EXAMPLES 5–8

*Solution or dispersion preparation of internal additive*

5% aqueous solutions or dispersions of diethylaminoethyl hydroxypropyl starch (DEAE-HPS) were prepared by mixing in water at 25° C. They were heated to 95° C. in an oil bath and held at 95° C. for 15 minutes while agitating.

*Paper Handsheet Preparation—Alum and unsized system—Clay and $TiO_2$ fillers*

A 2.5% consistency bleached kraft pulp slurry was beaten in a Noble and Wood cycle beater to a Schopper-Riegle freeness of 600 cc. 1% papermakers' alum (i.e. hydrated aluminum sulfate) was added to aliquots of the pulp slurry and the resulting slurry was adjusted to pH 4.5. Then 10% filler was added to the pulp.

The slurry was diluted to 0.5% consistency in a Noble and Wood proportioner using tap water containing 5 p.p.m. aluminum (as papermakers' alum) and then the slurry was adjusted to pH 4.5. DEAE-HPS (to serve as retention aid) was added (as a 0.005% aqueous solution) to aliquots from the proportioner. Paper handsheets weighing 40 lb./ream (ream is 500 24" x 36" sheets) were formed in a Noble and Wood sheet mold. The pulp was diluted to 0.05% consistency in the mold with tap water adjusted to pH 5.0. The sheets were pressed and dried in the conventional manner of the Noble and Wood handsheet system. Then the percent retention of filler was determined by standard procedure from the ash contents of the paper handsheets.

Further details appear in Table 3 hereinafter.

TABLE 3.—RETENTION EFFICIENCY—ALUM AND UNSIZED SYSTEM

| Example No. | Retention Aid | | Percent Retention | |
|---|---|---|---|---|
| | Type | Amount Added [2] | Clay [3] | $TiO_2$ |
| 5 | Control | None | 21 | 41 |
| 6 | DEAE-HPS [1] | 0.04 | 28 | 42 |
| 7 | DEAE-HPS [1] | 0.20 | 47 | 46 |
| 8 | DEAE-HPS [1] | 0.40 | 52 | 49 |

[1] Diethylaminoethyl hydroxypropyl starch maintained ungelatinized (i.e. granular) during preparation but which was in gelatinized state when used.
[2] Percent by dry weight of pulp.
[3] Type used is known in trade as kaolin.

EXAMPLES 9–12

*Solution or dispersion preparation of internal additive*

5% aqueous solutions or dispersions of diethylaminoethyl hydroxypropyl starch (DEAE-HPS) were prepared by mixing in water at 25° C. They were heated to 95° C. in an oil bath and held at 95° C. for 15 minutes while agitating.

*Paper Handsheet Preparation—Alum free and unsized system—Clay and $TiO_2$ fillers*

A 2.5% consistency bleached kraft pulp slurry was beaten in a Noble and Wood cycle beater to a Schopper-Riegler freeness of 600 cc. Aliquots of the pulp slurry were adjusted to pH 8.0. Then 10% filler was added to the pulp.

The slurry was diluted to 0.5% consistency in a Noble and Wood proportioner using tap water adjusted to pH 8.0. DEAE-HPS (to serve as retention aid) was added (as a 0.005% aqueous solution) to aliquots from the proportioner. Paper handsheets weighing 40 lb./ream (ream is 500 24" x 36" sheets) were formed in a Noble and Wood sheet mold. The pulp was diluted to 0.05% consistency in the mold with tap water adjusted to pH 8.0. The sheets were pressed and dried in the conventional manner of the Noble and Wood handsheet system. Then the percent retention of filler was determined by standard procedure from the ash contents of the paper handsheets.

Further details appear in Table 4 hereinafter.

TABLE 4.—RETENTION EFFICIENCY—ALUM FREE AND UNSIZED SYSTEM

| Example No. | Retention Aid | | Percent Retention | |
|---|---|---|---|---|
| | Type | Amount Added [2] | Clay [3] | $TiO_2$ |
| 9 | Control | None | 12 | 34 |
| 10 | DEAE-HPS [1] | 0.04 | 13 | 40 |
| 11 | DEAE-HPS [1] | 0.20 | 31 | 55 |
| 12 | DEAE-HPS [1] | 0.40 | 50 | 59 |

[1] Diethylaminoethyl hydroxypropyl starch maintained ungelatinized (i.e. granular) during preparation but which was in gelatinized state when used.
[2] Percent by dry weight of pulp.
[3] Type used is known in trade as kaolin.

Experiments along the line of the foregoing have also shown that the starch ether products of the present invention perform well to give paper of substantially increased dry strength and to retain paper additives, and that said starch ethers perform these functions either simultaneously or separately.

As disclosed hereinbefore the starch ether products and process of preparing the same are not per se a part of the present invention; both are well known in the art. The diethylaminoethyl hydroxypropyl starch used in Examples 2, 4, 6–8 and 10–12 hereinbefore were prepared as follows:

450 grams of spray dried wheat starch was suspended in 450 grams of water and to this suspension was added 40 grams of sodium chloride and 16 grams of diethylaminoethyl chloride hydrochloride. To the resulting suspension was added a solution of 12 grams sodium hydroxide and 20 grams sodium chloride in 100 grams of water. To this final suspension was added 12 grams of propylene oxide. Agitation was employed throughout the preparation of this reaction mixture at a temperature of about 30° C. The etherification reaction was carried out for 16 hours at 30° C. while continuing to agitate. The resulting reaction mixture was adjusted to a pH of 3.5 with phosphoric acid, centrifuged, washed with water and spray dried to obtain an ungelatinized (i.e. granular) diethylaminoethyl hydroxypropyl starch product having an aminoalkyl D.S. of 0.03 and a hydroxypropyl M.S. of 0.013.

As those skilled in the art will appreciate, many variations may be made in the foregoing examples within the scope of the present invention, some of which are set forth hereinafter.

Although for the sake of clarity and simplicity the present invention is described hereinbefore for the most part with reference to diethylaminoethyl hydroxypropyl starch ether, the present invention is applicable broadly to the use of cationic-nonionic starch ethers. Applicable cationic-nonionic starch ethers include those having the formula:

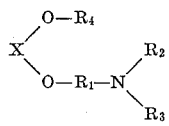

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycloalkyl, and $R_4$ is hydroxyalkyl. Of course, the $R_4$ group may be attached to the same anhydroglucose unit as the

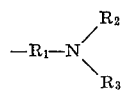

radical, or the $R_4$ group may be attached to a different anhydroglucose unit. Still more specifically preferred are the lower dialkylaminoalkyl hydroxyalkyl starches, e.g. diethylaminoethyl hydroxypropyl starch, diethylaminoethyl hydroxyethyl starch, dimethylaminoethyl hydroxypropyl starch, diethylaminohydroxypropyl hydroxypropyl starch, etc.

The amount of cationic-nonionic starch ethers applicable in the present invention is not critical and may vary over a wide range, the amount being given herein by dry weight basis of the wood pulp or other cellulosic material being used as the papermaking furnish. However, usually a larger amount is used for increased dry strength than for retention. Also, from the standpoint of economy, normally one will not exceed about 10% (preferably 5%) for increased dry strength and about 8% (preferably 3%) for retention. Amounts as low as 0.001% have given substantial retention results, and amounts as low as 0.1% have given substantial dry strength improvements, but these amounts are more apt to be at least 0.01% and at least 0.3%, respectively.

Of course, in order to function properly and efficiently to give increased dry strength, a material must be retained on the papermaking fibers and many such materials are dependent on alum for this. However, the starch ethers of the present invention are adsorbed directly onto the cellulose fibers independently of alum and show good retention both with and without alum over the entire pH range (about 4–10) normally used in most papermaking processes. Furthermore the starch ethers of the present invention increase retention of paper additives on cellulose fibers. The starch ethers used in the present invention not only serve to give good sheet formation, to give paper of increased dry strength and to retain paper additives, but said starch ethers also serve in conjunction with sizes to give paper of increased ink resistance. If unmodified starch alone is used, it gives neither the desired dry strength nor the required retention of paper additives.

Thus, the internal additives of the present invention may be used alone solely as such to give paper of increased dry strength and excellent formation, or they may be used in combination with one or more paper additives either at an acid, neutral or alkaline pH.

The starch ethers and the paper additives of the present invention may be added in a number of ways, as is well known in the art, e.g. as an aqueous solution or dispersion, or even in solid form provided they are uniformly mixed with the pulp slurry, and they may be added at any point before forming the wet lap on the screen of the papermaking machine at any desired pH.

Although the examples hereinbefore show using clay and titanium dioxide as fillers, fillers in general are applicable in the present invention. Representative fillers include, for example, clay, calcium carbonate, magnesium carbonate, titanium dioxide, and talc. The amount of paper additive applicable in the present invention is not critical and will depend on a number of things well known in the art and may vary widely. For example the amount of paper additive in some cases will be about 0.01%–50%, but for most uses the amount will fall within the range of about 0.1%–20% by weight of the pulp on a dry basis. When dyes are the paper additive, the amount may be as low as about 0.001% but more often as low as about 0.01%.

As those skilled in this art will appreciate, there are applications where beating the pulp is unnecessary, and when beating is employed, the extent of beating may vary considerably depending on the type pulp being used and the type paper being made. Beating to a Schopper-Riegler freeness of 850 cc.–300 cc. usually will be adequate for most purposes, freeness varying inversely with beating time. In the foregoing examples beating to a freeness of 820 cc. and 600 cc. was sufficient to give good results.

The starch ethers applicable herein must be kept in an ungelatinized (i.e. granular) state while preparing them, but they must be in a gelatinized state when used. This was determined by repeating the foregoing examples except for not cooking at 95° C. for 15 minutes the aqueous dispersions of the granular diethylaminoethyl hydroxypropyl starch before adding to the pulp slurry; the results with the uncooked aqueous dispersions were unsatisfactory.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Paper of excellent formation and superior dry strength containing uniformly distributed among the papermaking fibers thereof a cationic-nonionic starch ether, said starch ether having the formula:

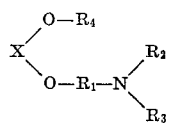

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycloalkyl, and $R_4$ is hydroxyalkyl, said starch ether being in the gelatinized state when used in making said paper but gelatinization having been avoided during preparing said starch ether.

2. Product of claim 1 wherein the starch ether is a cationic-hydroxyalkyl starch ether.

3. Product of claim 1 wherein the starch ether is a dialkylaminoalkyl hydroxyalkyl starch ether.

4. Product of claim 1 wherein the starch ether is diethylaminoethyl hydroxypropyl starch.

5. Paper of excellent formation and superior dry strength containing uniformly distributed among the papermaking fibers thereof a cationic-nonionic starch ether and a paper additive, said starch ether having the formula:

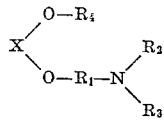

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycoalky, and $R_4$ is hydroxyalkyl, said starch ether being in the gelatinized state when used in making said paper but gelatinization having been avoided during preparing said starch ether.

6. Paper of excellent formation and supreior dry strength containing uniformly distributed among the papermaking fibers thereof a cationic-nonionic starch ether and a size, said starch ether having the formula:

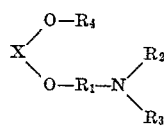

wherein X is starch, $R_1$ is selected from the group consisting of alkylene and hydroxyallkylene, $R_2$ and $R_3$ are each selected from the group consisting of alkyl, aryl, aralkyl, cycloalkyl and heterocycloalkyl, and $R_4$ is hydroxyalkyl, said starch ether being in the gelatinized state when used in making said paper but gelatinization having been avoided during preparing said starch ether.

7. Paper of excellent formation and superior dry strength containing uniformly distributed among the papermaking fibers thereof of a cationic-nonionic starch ether and a filler, said starch ether having the formula:

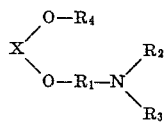

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycloalkyl, and $R_4$ is hydroxyalkyl, said starch ether being in the gelatinized state when used in making said paper but gelatinization having been avoided during preparing said starch ether.

8. Paper of excellent formation and superior dry strength containing uniformly distributed among the papermaking fibers thereof a cationic-nonionic starch ether, a size and a filler, said starch ether having the formula:

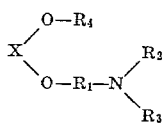

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycloalkyl, and $R_4$ is hydroxyalkyl, said starch ether being in the gelatinized state when used in making said paper but gelatinization having been avoided during preparing said starch ether.

9. In a method of making paper comprising forming an aqueous slurry of a fibrous material, passing the slurry onto a screen and thereby forming a sheet of the fibrous material and causing most of the water to drain therefrom, and then pressing and drying the sheet to obtain the final paper product, the improvement which comprises adding to the slurry, prior to passing the slurry onto the screen, a cationic-nonionic starch ether, said starch ether having the formula:

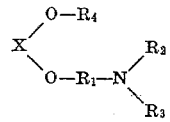

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycloalkyl, and $R_4$ is hydroxyalkyl, said starch ether being in the gelatinized state when used in making said paper but gelatinization having been avoided during preparing said starch ether.

10. Method of claim 9 wherein the starch ether is diethylaminoethyl hydroxypropyl starch.

11. In a method of making paper comprising forming an aqueous slurry of a fibrous material, passing the slurry onto a screen and thereby forming a sheet of the fibrous material and causing most of the water to drain therefrom, and then pressing and drying the sheet to obtain the final paper product, the improvement which comprises adding to the slurry, prior to passing the slurry onto the screen, a cationic-nonionic starch ether and a paper additive, said starch ether having the formula:

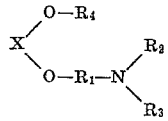

wherein X is starch, $R_1$ is selected from the group consisting of alkylene and hydroxyalkylene, $R_2$ and $R_3$ are each selected from the group consisting of alkyl, aryl, aralkyl, cycloalkyl and heterocycloalkyl, and $R_4$ is hydroxyalkyl, said starch ether being in the gelatinized state when used in making said paper but gelatinization having been avoided during preparing said starch ether.

References Cited by the Examiner

UNITED STATES PATENTS

| | | | |
|---|---|---|---|
| 2,813,093 | 11/1957 | Caldwell et al. | 260—233.3 |
| 2,935,436 | 5/1960 | Caldwell et al. | 162—175 |
| 3,017,294 | 1/1962 | Meisel | 162—175 |
| 3,070,452 | 12/1962 | Harris et al. | 260—233.3 |
| 3,070,594 | 12/1962 | Harris et al. | 260—233.3 |

DONALL H. SYLVESTER, *Primary Examiner.*

MORRIS O. WOLK, *Examiner.*